J. MUTTY.
Feed-Rollers to Circular-Saws.
No. 5,805. Reissued March 24, 1874.
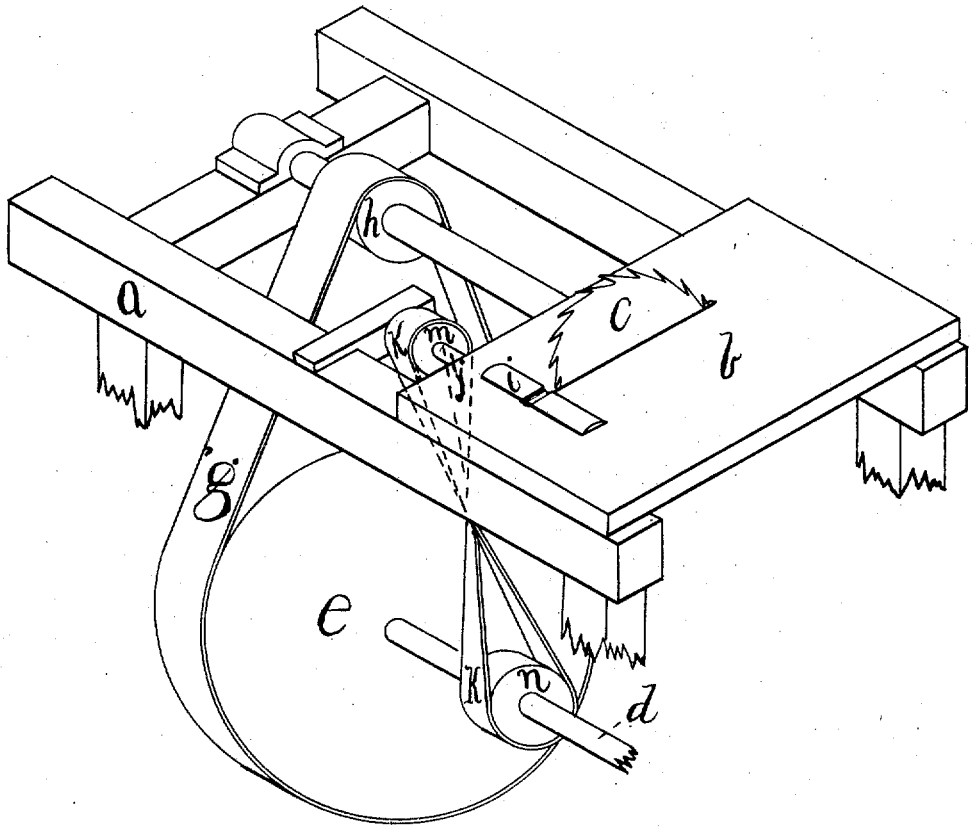
Witness
W. E. Brown
N. H. Brown
Inventor
John Mutty
Per Wm Franklin Jeavey Atty
AM. PHOTO-LITHOGRAPHIC Co. N.Y. (OSBORNE'S PROCESS.)

UNITED STATES PATENT OFFICE.

JOHN MUTTY, OF BREWER, MAINE.

IMPROVEMENT IN FEED-ROLLERS TO CIRCULAR SAWS.

Specification forming part of Letters Patent No. 52,188, dated January 23, 1866; reissue No. 5,805, dated March 24, 1874; application filed June 12, 1873.

*To all whom it may concern:*

Be it known that I, JOHN MUTTY, of Brewer, in the county of Penobscot and State of Maine, have invented certain new and useful Improvements in Feed-Rollers to Circular Saws; and do hereby declare that the following is a full, clear, and exact description thereof that will enable others skilled in the art to which it appertains to make and use the same, reference being had to the accompanying drawings and to the letters of reference marked thereon, which form a part of this specification, in which is shown a perspective view of a sawing-machine with my invention attached.

My invention is designed to apply to that class of sawing-machines having a circular saw running in a stationary table, and is intended to feed the lumber to the saw. This work is now commonly done by hand, and the lumber coming directly in contact with the saw-table, the resistance resulting from the friction between the moving lumber and the stationary surface of the table is considerable. It is occasioned in part, of course, by the weight of the stick, but principally by the operation of the saw, the teeth of which, cutting downward, tend to press it down upon the table, causing it to bind. The degree of this downward pressure of course depends upon the size and nature of the timber, as the thicker or denser the stick the greater resistance it will offer to the cutting action of the saw-teeth, and the harder it will be pressed upon the table. My invention aims at avoiding this resistance to the forward motion of the lumber, and providing a device for feeding it to the saw by power. I effect my purpose by means of a roller attached to or inserted in the stationary table and projecting slightly above its surface. This roll is driven by power, and as the lumber passes over it it is fed forward by the friction or contact of its under surface with the surface of the revolving-roll, requiring little or no assistance from the operator.

Referring to the drawing, I will now explain my invention. At *a* is shown the frame of the machine. *b* is the stationary table; *c*, the saw; *d*, the driving-shaft; *e*, pulley thereon, giving revolution to the saw by the belt *g* passing over the pulley *h* on the saw-arbor. At *i* is the feed-roll, on a shaft, *j*, running in suitable bearings attached to the frame of the machine. As shown, it projects slightly above the surface of the table through an opening therein, and is driven by a cross-belt, K, running from a pulley, *m*, on the end of its shaft *j*, to a pulley, *n*, on the driving-shaft *d*.

Ordinarily, when friction feed-rolls are employed for feeding lumber, a second roll is used, pressing upon the upper side of the stick for the purpose of keeping it down upon the feed-roll and to increase the friction between them.

An important feature of my invention consists in so placing my feed-roll, in reference to the saw, as to do away with this upper or pressure-roll, making the saw do its work and supply the pressure necessary to keep the lumber down upon the feed-roll. To effect this, I place my roll close to the periphery of the saw. In this position the downward cutting action of the saw-teeth (which in machines without a roll makes the lumber bind upon the table) operates to press the lumber down upon the roll and to increase its bite. Moreover, this pressure thus derived from the saw has the advantage of being self-regulating, for as the stick is larger or closer grained, and requires more power, or what is the same thing more friction, between it and the roll, to feed it forward, in the same proportion it offers greater resistance to the downward cutting-action of the saw-teeth, and is pressed harder upon the roll, supplying the greater friction and power required. In this way I utilize and derive important aid for feeding the lumber from the very property which in ordinary machines is the greatest obstacle to its progress past the saw.

What I claim, and desire to secure by Letters Patent, is—

In a circular sawing machine, the arrangement of a revolving frictional feed-roll, with reference to the saw, that the downward cutting action of the saw-teeth as they pass through the lumber shall operate to keep it upon the feed-roll and to increase the friction between these surfaces, substantially as herein specified and shown.

In testimony that I claim the foregoing I have hereunto set my hand this 5th day of June, 1873.

JOHN MUTTY.

Witnesses:
N. H. BROWN,
WM. FRANKLIN SEAVEY.